Sept. 26, 1950     A. BARTEL     2,523,271
LOAD SUPPORTING PALLET
Filed Oct. 25, 1944     2 Sheets-Sheet 2
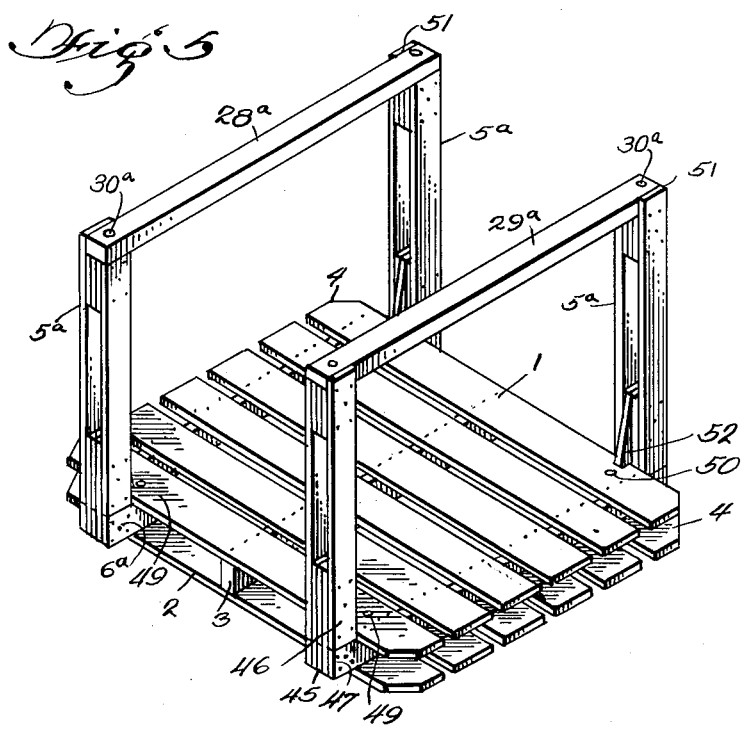
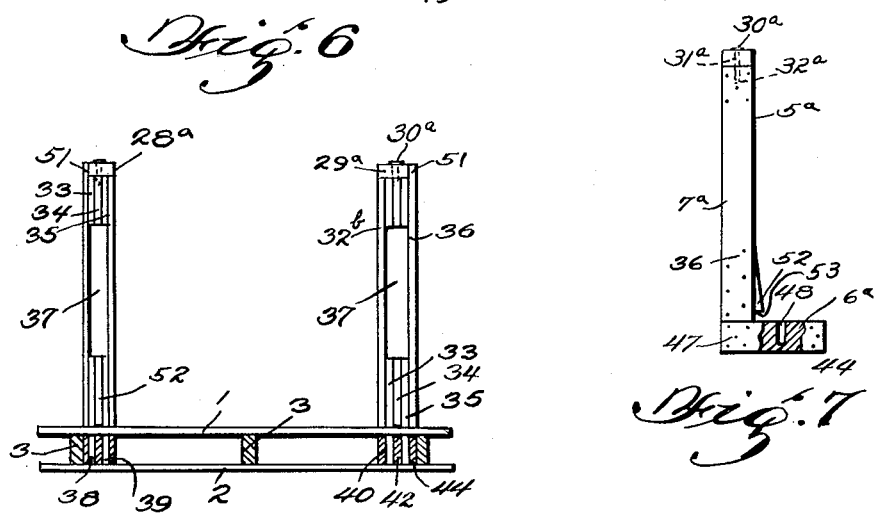
INVENTOR.
Arthur Bartel
BY
William F. Diamond
ATTORNEY Patented Sept. 26, 1950

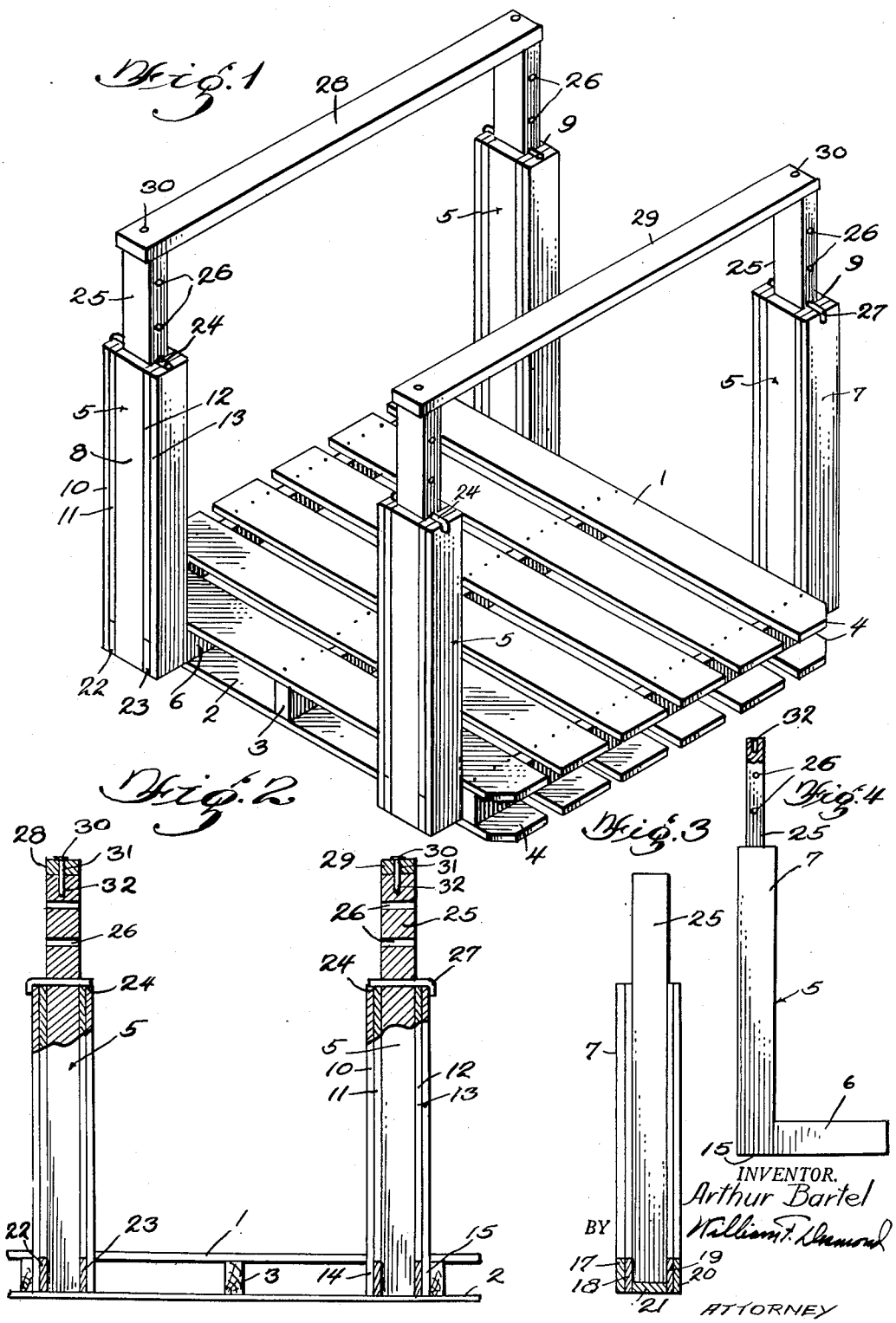

2,523,271

UNITED STATES PATENT OFFICE 2,523,271

LOAD SUPPORTING PALLET

Arthur Bartel, United States Army,
Comfort, Tex.

Application October 25, 1944, Serial No. 560,296

14 Claims. (Cl. 248—120)

(Granted under the act of March 3, 1883, as amended April 30, 1928; 370 O. G. 757)

The invention described herein, if patented may be manufactured and used by or for the Government for governmental purposes, without payment to me of any royalty thereon.

This invention relates to pallets and more particularly to pallets used in the transportation of loose articles or materials whereby the same way may be transported in bulk.

Pallets of ordinary construction are used in large numbers in the operation of factories, warehouses, railroads and the like for the convenient storage and transportation of a large variety of articles and materials. Such pallets are usually in the form of a platform, upon which the articles are piled indiscriminately or arranged in order, and the pallet with its load is then picked up as a unit by a machine especially constructed for that purpose and carried about to whatever convenient location is desirable. In this way large quantities of irregularly shaped articles or bulky materials can be quickly moved.

As ordinarily constructed the pallets in use heretofore have had the disadvantage that when employed without sides they could accommodate only limited loads because of the danger of articles falling off in transportation, and when provided with sides the pallets occupied too much space and were inconvenient for storing when not in use. A further inconvenience encountered in the use of pallets with sides has been that it is difficult to load and unload the same with heavy articles because each article must be lifted high enough to clear the side of the pallet.

It is an object of this invention to obviate the disadvantages noted above and provide a pallet of increased capacity without substantially increasing the storage space for such pallets when not in use.

A further object is to provide a pallet of the type referred to capable of supporting a large bulk of material without the attendant danger of damage caused by articles falling off the pallet while in transit.

Further objects of the invention are to provide a pallet having upright supports at the sides which are readily attached and removed, so that the supports and the pallets together will occupy a minimum of storage space when not in use, and the pallets can be used with or without the uprights, whichever may prove most convenient.

Still further objects of the invention are to provide a pallet of this kind of simple and rugged construction having no complicated or expensive parts and constructed of easily obtainable material.

The nature of the invention will be understood from the following description taken with the accompanying drawings in which several embodiments are illustrated. In the drawings:

Figure 1 is a view in perspective showing uprights made in accordance with the invention assembled with a pallet and ready for use therewith.

Figure 2 is an end view of the assembled uprights and pallet of Figure 1, the uprights being partially broken away to disclose their structure.

Figure 3 is an end view of one of the uprights of Figure 1.

Figure 4 is a side view of the same.

Figure 5 is a view showing in perspective a modified form of the uprights of the invention assembled with a pallet.

Figure 6 is an end view of the assembled uprights and pallet of Figure 5, and

Figure 7 is a side view of one of the uprights of Figure 5.

As illustrated by Figures 1 to 4 inclusive of the drawings, the pallet is of generally rectangular shape, consisting of the boards 1 and 2 arranged in two layers separated by the spacers 3, forming a platform having slightly rounded or beveled corners as at 4. This structure constitutes a pallet of the usual type adapted to be carried about by a machine having members fitting between the two layers of boards of the pallet by which the same is lifted up. The pallet is provided with removable uprights 5 having L-shaped extensions or feet 6 adapted for insertion between the boards 1 and 2.

The uprights 5 consist of a box-shaped vertical portion 7 formed by the single boards 8 and 9 at two sides, and the pairs of superposed boards 10, 11, 12 and 13 at the other two sides. At the foot of each of the vertical portions 7 of the uprights 5 the outer boards 10 and 13 project beyond the lower ends of the inner boards 11 and 12 as best seen at 14 and 15 in Figure 2 for interdigitation or overlapping with projecting portions of the foot 6 of the upright.

Each of the extensions or feet 6 is composed of the pairs of superposed boards 17, 18, 19 and 20 of a width to fit closely the space between the boards 1 and 2 of the pallet, and a single bottom board 21. The two inner boards 18 and 19 each have one end projecting beyond an end of the outer boards 17 and 20 as indicated by 22 and 23 for interdigitation or overlapping with the projecting portions of the vertical portion 7.

The joining of the above described projections of the vertical portion 7 and the foot 6 produces a strong and rugged structure thus providing an upright capable of withstanding the rough usage to which it is subjected.

Grooves 24 are formed in the upper ends of the uprights 5 for a purpose to be mentioned hereinafter.

Vertical extension pieces 25 are inserted in the top ends of the uprights 5, and are provided with spaced apart holes 26 for the insertion of removable pins 27 which rest in the grooves 24, so that these extension pieces can be adjusted and held at any desired height. Horizontal top members 28 and 29 extend between and rest upon the top ends of the extension pieces 25 as shown in Figure 1, and are secured in position by pins 30 inserted in aligning holes 31 and 32.

In the modification of the invention shown in Figures 5 to 7 inclusive the same form of platform is employed as that just described, but a modified form of upright is used wherein provision is made for more securely bracing the same and securing the foot in position in the pallet. The upright 5a, as shown in Figures 5 and 6, is of laminated construction made up of the vertically extending portion 7a and the foot 6a. The vertically extending portion 7a is composed of five boards, the three inner boards 33, 34 and 35 having their mid portions cut away as shown in Figure 6 to form the opening 37 serving to lighten the structure of the upright.

At the lower end of the vertical portion 7a of the upright 5a the two boards 33 and 35 extend beyond the ends of the boards 32b, 34 and 36 providing the projecting portions 38 and 39 for interdigitation or overlapping with projecting portions of the foot 6a.

The foot 6a of the upright 5a is composed of five boards the center board 42 and the two outer boards 40 and 44 of which extend at one end beyond the boards 32b and 36 forming the projecting portions 45, 46 and 47 for interdigitation or overlapping with the projecting portions 38 and 39 of the vertical portion 7a.

A hole 48 is provided in each foot 6a which aligns with the hole 49 in the pallet when the foot is inserted between the layers of boards 1 and 2, a pin 50 being inserted in these holes for securing the foot in position.

The board 46 projects upwardly beyond the top of the vertically extending portion 7a to form the projection 51 for a purpose to be mentioned hereinafter.

Horizontal top members 28a and 29a extend between and rest upon the top ends of the uprights 5a and are positioned and confined thereon by the projections 51. Each horizontal member 28a and 29a has holes 31a aligning with holes 32a in the upper ends of the uprights 5a through which holes the pins 30a are inserted for securing the horizontal members 28a and 29a in position.

The center board 34 of the vertically extending portion 7a is formed with a triangular projection 52 whose base 53 is adapted to be on top of the pallet when the upright 5a is applied thereto, and act as a brace in maintaining the upright in a vertical position.

In using the embodiment of the invention illustrated in Figures 1 to 4 the feet 6 of the uprights 5 are inserted near the corners of the pallet in the space between the boards 1 and 2. The vertical extension pieces 25 are raised to the desired extent and secured in position by inserting the pins 24 in the proper holes 26. The horizontal top members 28 and 29 are then positioned on the upper ends of the extensions 25 and the pins 30 inserted in aligned holes 31 and 32, thus securing together in pairs the upper ends of the extensions 25. The articles to be carried by the pallet can then be piled thereon and will be positioned and confined by the uprights and the horizontal top members. By this means a much larger bulk can be carried on the pallet without danger of damage resulting from articles slipping and falling therefrom in transit.

When the pallets are to be used without the uprights or are to be stored, the pins 30 are lifted out, the horizontal top members 28 and 29 lifted off, and the uprights removed from the pallets by pulling the feet 6 from between the boards 1 and 2.

The pallets and uprights can then be arranged to occupy much less storage space than would be required for the storage of pallets with permanent sides.

The embodiment of the invention illustrated in Figures 5 to 7 is used in the same manner as that just described, except that the pins 50 are inserted through holes 49 in the boards 1 and into the holes 48 in the feet 6a.

This method of securing the uprights to the pallet, together with the triangular bracing portions 52 and the horizontal top members 28a and 29a forms a light but strong and rigid structure capable of carrying a heavy load.

The pallets in this form of the invention can be stored away in the same way as those previously described, it being necessary, of course to lift out the pins 50 before removing the uprights 5a from the pallets.

It will be noted that the layers of boards 1 and 2 constitute load engaging surfaces, upon either of which the load may be positioned, while the other surface engages the ground or some other support. The uprights when applied to a pallet are situated outside of the load supporting area thereof keeping available substantially the entire area of the pallet for contacting the load. The horizontal top members extend across only two sides of the pallet so that two sides thereof remain substantially unobstructed for loading and unloading operations which will thus require only a minimum of lifting.

It will thus be apparent that the invention provides a means whereby a pallet of standard construction may have its capacity and usefulness increased, without reducing its utility for other purposes, or substantially increasing the space required for its storage when not in use.

Having thus clearly shown and described the invention what is claimed and desired to secure by Letters Patent is:

1. In a load supporting device, spaced apart load bearing floors, removable load-confining uprights extending above said floors, said uprights having horizontal portions adapted to extend between and engage said floors, to maintain said uprights in vertical load-confining positions.

2. In a load supporting device, spaced apart load bearing floors, removable load-confining uprights removably carried by said floors, said uprights having horizontal portions adapted to extend between and engage said floors, to maintain said uprights in vertical load-confining positions.

3. In a load supporting device, spaced apart load bearing floors, removable uprights extending above said floors, said uprights having horizontal portions adapted to extend between and engage said floors, to maintain said uprights in vertical load-confining positions, and horizontal members connecting the upper ends of said uprights.

4. In a load supporting device, spaced apart load bearing floors, extensible removable uprights extending above said floors, said uprights having horizontal portions adapted to extend between and engage said floors, to maintain said uprights in vertical load-confining positions, and horizontal members connecting in pairs the upper extremities of said uprights.

5. In a load supporting device, spaced apart load bearing floors, uprights extending above said floors, said uprights having horizontal portions adapted to extend between and engage said floors to maintain said uprights in vertical load-confining positions and bracing means on said uprights above said horizontal portions for engaging one of said floors.

6. In a load supporting device, spaced apart load bearing floors, removable uprights extending above said floors, said uprights having horizontal portions adapted to extend between and engage said floors, to maintain said uprights in vertical load-confining positions, bracing means on said uprights above said horizontal portions for engagement with one of said floors, and horizontal members connecting the upper ends of said uprights.

7. In a load supporting device, spaced apart load bearing floors, removable uprights extending above said floors, said uprights having portions adapted to extend between and engage said floors, to maintain said uprights in vertical load-confining positions, means associated with said horizontal portions for securing the same in position between said floors. bracing means on said uprights above said horizontal portions adapted to engage one of said floors, and horizontal members connecting the upper ends of said uprights.

8. In a load supporting device, spaced apart load bearing floors, load-confining uprights extending above said floors, horizontal members connecting said uprights, one of said load bearing floors defining the bottom of a load containing space, said uprights and connecting members defining sides of said space, said space having two unobstructed sides.

9. In a load supporting device, spaced apart load bearing floors, one of which defines the bottom of a load containing space, removable load-confining uprights extending above said floors, horizontal members connecting said uprights, said uprights and horizontal members defining opposite sides of said space, said space having opposite unobstructed sides.

10. In a load supporting device, spaced apart load bearing floors, extensible uprights extending above said floors, said uprights having portions adapted for insertion between and engagement with said floors, to maintain said uprights in vertical load-confining positions, horizontal members connecting the upper ends of said uprights, one of said floors defining the bottom of a load receiving space of variable capacity, said uprights and horizontal members defining sides of said space, said space having unobstructed accessibility from two sides.

11. In a load supporting device, spaced apart load bearing floors, uprights extending above said floors, said uprights having horizontal portions adapted for insertion between and engagement with said floors, to maintain said uprights in vertical load-confining positions, means for securing said horizontal portions between said floors, bracing means on said uprights above said horizontal portions for engaging one of said floors, horizontal members extending between some of said uprights and connecting the upper ends of the same, one of said floors defining the bottom of the load receiving space of said device, said uprights and horizontal members defining sides of said space, said space being accessible from two sides.

12. A load supporting device including a pallet having a load supporting floor, load-confining uprights, means extending outwardly from the lower portion of said uprights and insertible beneath the top of the floor to hold said uprights in a vertical position, horizontal members secured to and uniting the upper ends of said uprights, said uprights and horizontal members constituting two opposite sides of the load receiving space of the device, the other sides of said space being unobstructed.

13. A load supporting device including a rectangular pallet, load-confining uprights removably carried by said pallet, means extending outwardly from the lower portion of said uprights and insertible beneath the top of the pallet to hold said uprights in a vertical position, said uprights combining to form vertical corners of the load receiving space of said device, horizontal members connecting the upper ends of some of said uprights, said uprights and horizontal members constituting sides of said space, other sides of said space giving unobstructed access to said load receiving space.

14. In a load supporting device, spaced apart load-bearing floors, uprights extending above said floors, said uprights having extensions adapted for insertion between said floors to maintain said uprights in vertical load-confining position and means on at least one of said floors for engaging and holding said extensions between said floors.

ARTHUR BARTEL.

REFERENCES CITED

The following references are of record in the file of this patent:

UNITED STATES PATENTS

| Number | Name | Date |
|---|---|---|
| 589,971 | Kephart | Sept. 14, 1897 |
| 828,290 | Hutchins | Aug. 7, 1906 |
| 1,349,500 | Dietz | Aug. 10, 1920 |
| 2,297,347 | Cruickshank | Sept. 29, 1942 |
| 2,330,852 | White | Oct. 5, 1943 |

Certificate of Correction

Patent No. 2,523,271 — September 26, 1950

ARTHUR BARTEL

It is hereby certified that error appears in the printed specification of the above numbered patent requiring correction as follows:

Column 1, line 7, after the word "same" strike out "way"; column 4, line 65, for "removable" read *extensible*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*